United States Patent

Rao et al.

[11] 3,981,738
[45] Sept. 21, 1976

[54] GLUTEN WASHING AND DEWATERING DEVICE

[75] Inventors: Ganta Venkateswara Rao, Hutchinson; Dale Albert Garinger, Buhler; Floyd Kent Shoup, Hutchinson, all of Kans.

[73] Assignee: The United States of America as represented by the Secretary of Agriculture, Washington, D.C.

[22] Filed: Feb. 18, 1976

[21] Appl. No.: 659,160

[52] U.S. Cl. .................. 127/25; 127/23; 209/262; 209/273; 209/300
[51] Int. Cl.² ............................... C13L 1/00
[58] Field of Search ............ 127/23, 24, 25, 67; 209/262, 273, 300

[56] References Cited
UNITED STATES PATENTS

| 970,240 | 9/1910 | Kilborn | 209/262 X |
|---|---|---|---|
| 1,033,377 | 7/1912 | Bohn | 209/262 X |
| 1,083,128 | 12/1913 | Paatz | 127/25 |
| 1,535,811 | 4/1925 | Briggs | 127/25 |
| 2,530,823 | 11/1950 | Kilander | 127/23 X |
| 2,555,908 | 6/1951 | von Edeskuty | 127/67 X |
| 2,704,604 | 3/1955 | Rolston | 209/300 X |
| 3,669,739 | 6/1972 | Plaven | 127/25 X |
| 3,672,504 | 6/1972 | Grimes, Jr. | 209/300 X |

Primary Examiner—Morris O. Wolk
Assistant Examiner—Sidney Marantz
Attorney, Agent, or Firm—M. Howard Silverstein; David G. McConnell

[57] ABSTRACT

Device for gluten washing including a cylinder of increasing diameter having protruding helical flights. The cylinder presents an outward surface of peaked, elbow-shaped ridges. The cylinder and its helical wings are encompassed by a cylindrical, screen stator and the whole set at an angle above the horizontal in an enclosing tank. The bottom end of the stator is partially open to communicate with a feed hopper while the upper end, along with the cylinder, is subject to spray nozzles. A recirculation system conducts liquid from the bottom to the top of the tank.

22 Claims, 3 Drawing Figures

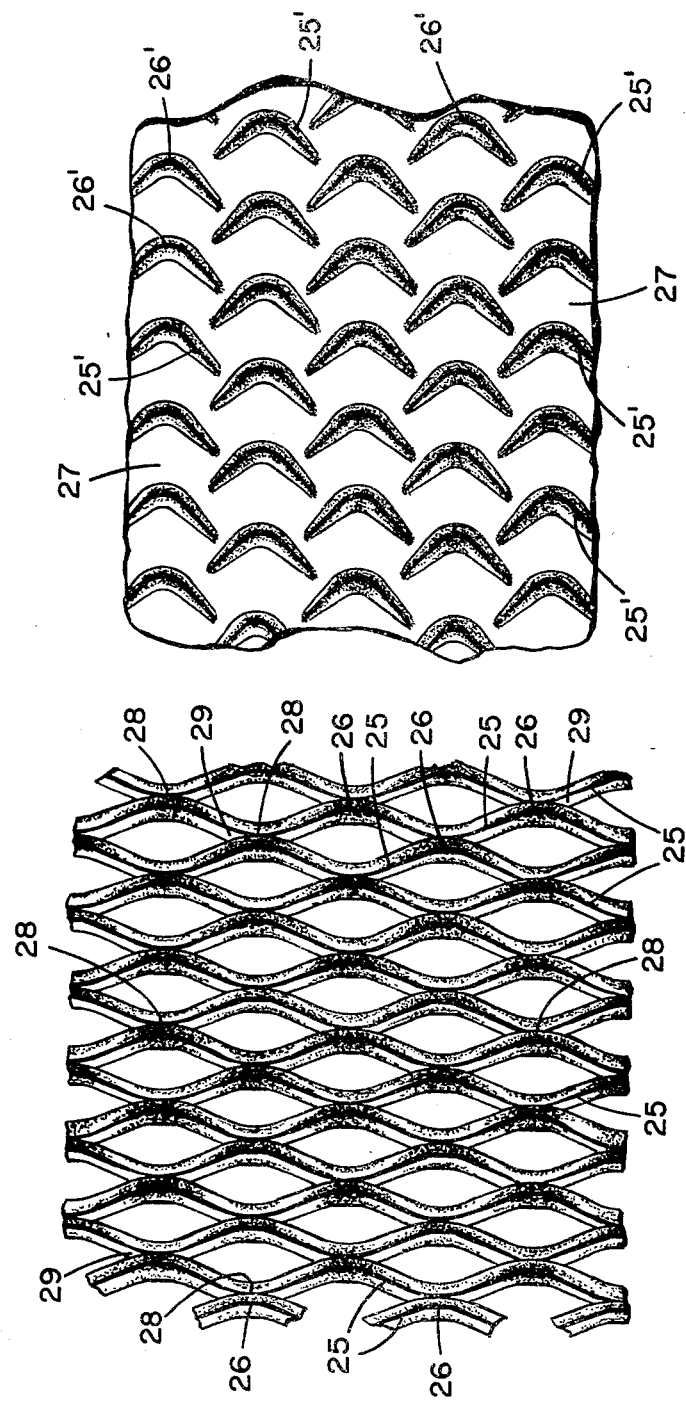

GLUTEN WASHING AND DEWATERING DEVICE

Gluten washers which incorporate helical elements are well known in the prior art. For example, U.S. Pat. No. 2,555,908 discloses co-acting helical conveyors set in a trough for countercurrent gluten washing.

U.S. Pat. No. 1,535,811 separates gluten from starch by introducing dough into a frusto-conical chamber having rotatably mounted therein a frusto-conical inner member with a corrugated or roughened surface and a sub-spiral flange. The clearance between the inner member and the chamber decreases as the bottom of the chamber is reached. In operation the rotating flange forces the dough down against both a screen in the lower side of the chamber and the rotating corrugated sides of the inner member while wash water is introduced. Parentheticaly, U.S. Pat. No. 2,388,902 discloses similar corrugated projections on the inside of a rotating drum which serve to agitate the dough during washing. This patent also employ shaft-mounted paddles for agitation.

U.S. Pat. Nos. 2,537,811, 2,530,823, and 2,557,032 teach using helical conveyors for mixing water with flour but they do not suggest washing concommitant with the mixing. Instead, the mixture is conveyed to screens where the gluten is separated.

Helices having a constant flight diameter coupled with gradually increasing shaft diameters are known in the present art, for example, U.S. Pat. Nos. 2,355,091, 1,467,737, and 1,354,528, and in the extruding or conveying arts, for example, U.S. Pat. No. 3,123,860. Helical extrusion devices are known which embody various mixing features, or features capable of mixing, associated with the helices. Exemplary are U.S. Pat. Nos. 2,838,794 (projections on the helix shaft), 3,671,141 (pegs on the shaft), 3,621,796 (bars on the helix wings) and 3,117,031 (screen wire flights). The prior art cited in this paragraph is provided because it is relevant to the use of the inventive device as a dewatering press, although it is our belief that the extrusion and pressing arts are non-analogous to that of gluten washing.

The known gluten washers, particularly those which employ a rotating drum, are unsatisfactory. The purity of vital gluten separated from starch, bran, and germ has been low, losses of gluten in the wash water excessive, and consumption of wash water — with attendant disposal and starch separation difficulties — intolerably high.

Accordingly, it is an object of this invention to separate wheat vital gluten from germ, bran, and starch with reduced losses of gluten and with lower wash water consumption.

It is a further object of this invention to obtain vital gluten in purity higher than heretofore obtained in industrial techniques.

It is still a further object of this invention to dewater vital gluten to substantially uniform moisture levels.

These and other objects of the invention will be apparent from the following description of the invention.

THE INVENTION

The inventive device generally comprises:

a. an armature fixed at an angle greater than horizontal, said armature thus having a lower and upper end, and including
 i. a cylinder having a smaller diameter at the lower end of said armature and a larger diameter at the upper end of said armature, said cylinder including a plurality of peaked, elbow-shaped ridges on its exterior surface;
 ii. helical flights set in a spiral around and protruding outwardly from said cylinder, said flights having substantially the same diameter throughout the entire length of said cylinder;

b. means for spraying liquid onto the upper end of said armature;

c. a stator substantially enveloping the length and circumference of said armature and spaced at a substantially constant distance from said helical flights, said stator being foraminous over a major portion thereof;

d. tank means for retaining liquid around and within at least a portion of said stator and for collecting liquid introduced by said spraying means, said tank means having a lower and upper end; and e. feed means communicating with the interior of said stator at the lower end of said stator and said armature for introducing a gluten-containing wheat product.

The apparatus may also include certain optional or preferred features. Foremost among these is a system for recirculating wash liquid from the bottom of the tank to the top thereof. This comprises a conduit from an opening at the lowest point in the tank to an opening in the top of the tank. Interposed in the conduit is a pump and an draw-off valve. The recirculation system permits the accumulation of starch, bran, and germ in the wash liquid to a optimum predetermined level, thereby resulting in lower net wash liquid consumption and greater facility in recovering secondary products such as starch.

The device may be supplied with a motor to power the armature rotation or mechanical power may be supplied from an exterior source.

The shape of the tank used to retain wash liquid about the lower portion of the stator is discretionary, but it is desirable to employ a tank having a rounded bottom conforming somewhat to the stator dimensions. This reduces the amount of wash liquid in the system. The tank, as the term is conceived herein, includes not only the chamber for retaining wash liquid around and within the lower portion of the stator but also an extension of the tank wall acting as a gutter below the upper portion of the stator. Since the gluten transported by the device into the stator upper portion is to be sprayed and not immersed as is the gluten in the stator lower portion, a gutter extending from the tank wall is sufficient to collect the sprayed wash liquid and to conduct it into the tank chamber about the stator lower portion. Thus, it is not desirable for economic reasons to fully enclose the stator in a tank but rather it is preferable to employ an adjunct gutter as described.

The helical flights are set at a pitch of about from 2 to 12 inches, although 9 inches is desired. The surface of the wings is generally smooth, although it may also be clothed in peaked, elbow-shaped ridges just as the cylinder.

It is preferred that the armature cylinder be clothed in or constructed of standard expanded metal. However, any cylinder exterior surface which presents a plurality of peaked, embow-shaped ridges is satisfactory. This particular form of roughness has been very effective in extracting starch, bran, and germ from vital wheat gluten without fragmenting the gluten mass. The ridges are peaked at the crook of the elbow and from thence tail off to zero elevation above an imaginary plane lying parallel to the curvature of the cylinder.

The ridges are desirably in such close proximity that they will nearly touch one another, and it is preferred that they be offset in a regular order. The ridges may adhere to a smooth, solid surface or they may be component structural elements as in standard expanded metal. Standard expanded metal is a well-known term of art that designates an iron, steel, or other metal diamond mesh produced by notching sheet metal followed by expanding or stretching the metal sideways. The product resembles a series of substantially identical, regularly sinuous, cross-sectionally square wires overlaid in offset fashion.

The cylinder diameter may increase either, i.e., incrementally, or gradually. The former is preferred for ease of fabrication. The specific clearance between the surface of the cylinder and the stator, the maximum diameter of the cylinder and the rate at which the cylinder diameter increases, depends upon the nature of the feedstock and the desired capacity of the device. This clearance normally varies from about 2¼ inches to 7/17 inch, while cylinder diameter maxima of 9 and 14 inches have been used satisfactorily. Similarly, the gap between the tip of the helical flights and the stator will be a function of the feedstock: Less for highly comminuted flours and more for rough products such as flaked wheat. Gaps of from about ¼ inch to ¾ inch have been found satisfactory. None of the foregoing dimensions are critical.

The stator is constructed of a foraminous or porous material such as screen wire. The material should have openings sufficiently large to allow bran, germ, and wash liquid to pass therethrough without permitting significant passage of gluten clumps and rope. These dimensions are a matter of routine experimentation based on the feed stock characteristics, but mesh having ¼ inch to ¾ inch wide openings has been found satisfactory. In particular, flattened expanded metal is preferred. Flat expanded metal differs from standard expanded metal in that the mesh lacks peaks since the ridges have been rolled flat. If smooth sheet material lined with flattened expanded metal is used at the area in the stator opposite the hopper some loss in gluten can be avoided, but at a risk of clogging the device.

The stator (and hence the armature) may be inclined at any angle above the horizontal, although at positions approaching vertical it is impractical to use a hopper for gravity feed. Instead, pumped introduction of feedstock is desirable at this point. The preferred device has a stator elevation of about 30° and employs a hopper feed.

Turning now to the figures:

FIGS. 2a and 2b are elevation views of suitable cylinder surfaces, with FIG. 2a representing standard expanded metal.

Figure 1:
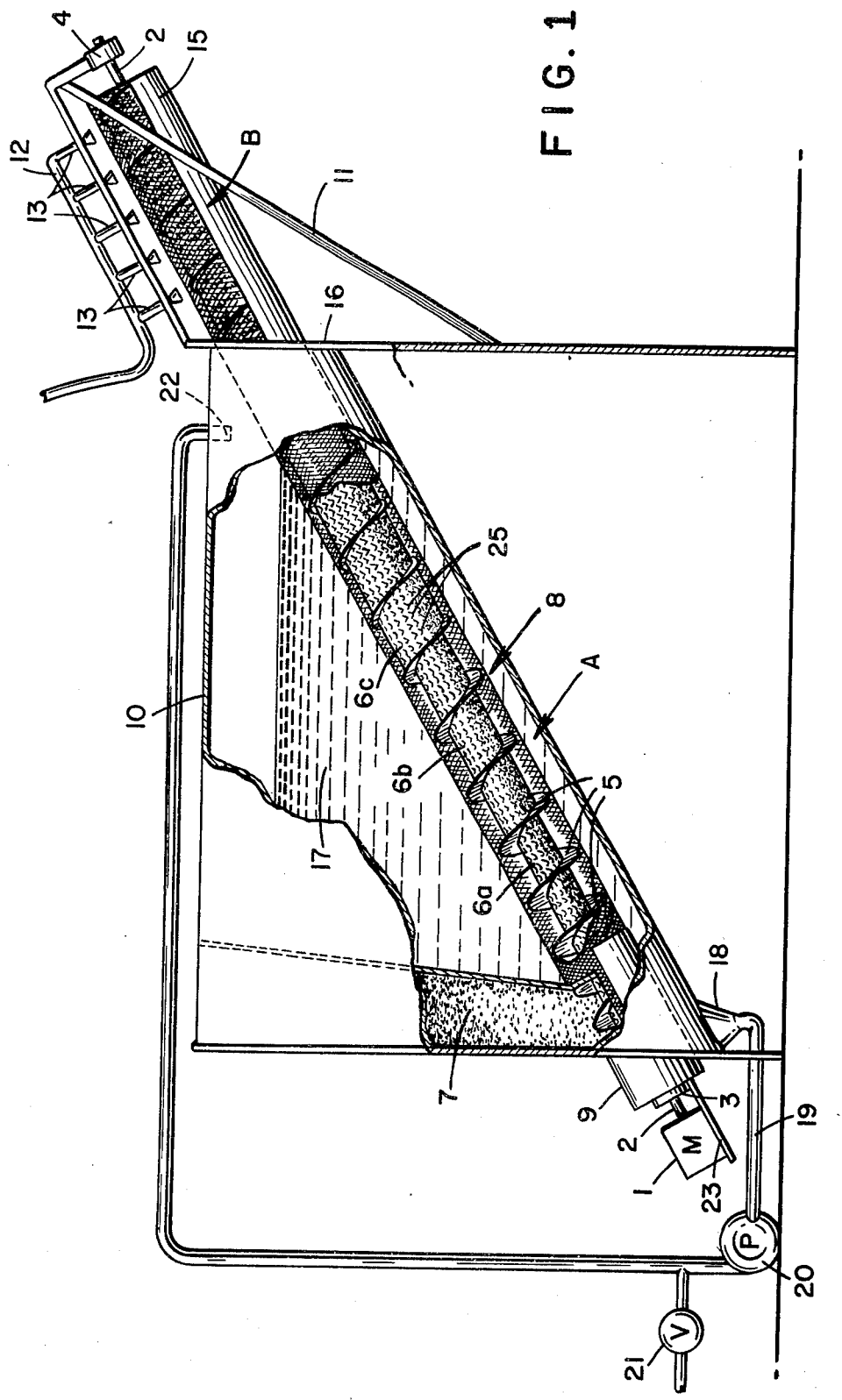
FIG. 1 is a partially cut-away elevation view of an embodiment of the inventive device.

Regarding FIG. 1, a motor 1 mounted on beam 23 provides the power to rotate shaft 2 within bearings 3 and 4. The shaft 2 extends through the longitudinal axis of the armature, designated generally at A. The shaft is fixed to the helical armature by any suitable means, e.g., spokes or gudgeon (not shown). The armature A comprises two principal components. First is the smooth, sheet metal helix flight 5 and second are the cylinder segments 6a, 6b, and 6c, which incrementally increase in diameter as the distance from the feed stock hopper 7 increases. The cylinder segments 6a, 6b, and 6c are constructed of smooth standard metal overlain with standard expanded metal, which presents an outer surface of peaked, elbow-shaped ridges 25. The armature is located along the longitudinal axis of the stator 8, which is a cylinder of flattened expanded metal. Tank 10 has been cut away to reveal stator 8, which in turn has been cut away to reveal armature A. Stator 8, anchored to the protrusion 9 in the tank 10, extends through the tank at an angle above the horizontal, passes through an opening (not shown) in the tank wall 16, and terminates outside of the tank 10. The portion of the stator 8 outside of the tank, designated generally at B, is self supporting. Beams 11 and 12 support the bearing 4 for the armature shaft 2. Spray nozzles 13 and spray water collection gutter 15 are attached to stator at B. Gutter 15 is spaced apart from stator 8 at B and communicates with tank 10 and with stator 8 at the opening (not shown) in the tank wall 16 through which stator 8 extends. Tank 10 is capable of holding wash water 17, which is withdrawn through drain 18 into a wash water recirculation system which includes pipe 19 leading to pump 20, to draw-off valve 21 and to outlet 22 in the top of tank 10. The bottom 24 of tank 10 is sloped in conformity with the stator 8 so as to reduce the volume of wash water in tank 10.

FIG. 2a portrays a portion of standard expanded metal. The peaks 26 are located on ridges 25, both of which rise above an imaginary plane (not shown) passing through joinder lines 28. The ridges 25 become structural members 29 upon intersecting said imaginary plane.

FIG. 2b illustrates an alternative embodiment for the outer surface of cylinders 6a, 6b, and 6c, useful as a substantial equivalent to the standard expanded metal described, supra. A substantially smooth, solid surface 27 is studded with elbow-shaped ridges 25'; the peak 26' is the highest point in the ridge 25'.

In the operation of our device, flaked wheat is placed in hopper 7 whence by gravity it is fed at the base of the hopper 7 into the armature A rotated by motor 1 at from 8 to 25 RPM. Preferred rotation speed depends on screw size. At this point the hydrostatic pressure of water in tank 10 forces water into the flaked wheat being churned and kneaded by the armature. The ridges 25 presented by the standard expanded metal cylinder 6a further serve to further agitate and knead the wheat flakes and water mixture. This forms a doughy, plastic mass which is advanced up the armature A by the rotation of the helical flights 5, thus forming a gluten rope. The surface of the rope is scraped or picked at by the peaked ridges 25 and to a lesser extend by the stator 8. This lossens particles of bran and germ as well as exposes the interior of the rope and the starch therein to wash water. The action of the armature flights 5 and the flow of wash water through tank 10 function to force bran, germ, and starch through stator 8 to the outlet 18 in the bottom of tank 10. Thereafter, the wash water containing bran, germ, and starch is recirculated through outlet 22 to increase concentration, although in the usual mode of operation some wash water and its contents are removed at valve 21. An important feature of the invention is the increase in diameter of the armature cylinder, which is represented by segments 6a, 6b, and 6c. Each segment has a progessively larger diameter, and this operates to reduce the clearance between the standard expanded metal ridges 25 on segments 6a, 6b, and 6c and the stator 8. Thus the rope is compressed and flattened as it advances up the armature, and as purity, elasticity, and cohesiveness increase so does its agitation by ridges 25. After the rope has passed into the region of maximum cylinder diameter the agitation is no longer continued in the presence of wash water, which contains a certain level of starch, bran, and germ, but rather under a gentle spray of clean water from spray 13. This wash water increases the purity of the gluten as it floods over the gluten rope and into gutter 15, thence to tank 10. The rope advances through an opening (not shown) in gutter 15 below shaft 2 at the upper end of stator 8.

The entire process may be repeated in multiple cycles of the same feedstock by taking the gluten from one run and feeding it into the washer again. Gluten containing at little as 0.90 percent fiber can be obtained after three passes of feedstock.

The temperature of the wash water is not critical and it may vary about from 25° F. to 120° F. A temperature of about from 80° F. to 85° F. is most effective at achieving maximum wash efficiency with the least deterioration in gluten vitality.

The inventive device is suitable for use with any gluten-containing wheat product which is contaminated with starch, bran, or germ, or any combination thereof. Flaked wheat or wheat flour are the most commonly used products.

A brief prewash of the product to remove surface starches may be helpful. The device is also useful for dewatering vital gluten to a substantially uniform water content of about from 57 to 60 percent so long as the initial gluten water content is in the range of 65–85 percent by weight. The device for this use comprises only stator, armature, and feed means for wet gluten. A tank may be useful to collect expressed water but it is unessential and, of course, the recirculation and spray means would be superfluous.

Turning to a specific preferred embodiment of the inventive gluten washer as portrayed in FIG. 1, the armature helix wings are at a 9 inch pitch, the armature including helix flights is 9 inches in diameter, the armature cylinders increase incrementally in diameter in three steps, the first being 6.76 inches for about the first two feet, the second being 7.5 inches for about the next foot and the third being 8.5 inches for the remainder of the armature. Of course, the clearance between the armature cylinders and the stator, which has an inside diameter of 9.25 inches, will be reduced commensurately. The angle of stator and armature inclination is 30° above the horizontal. The stator is constructed of ½ inch flattened expanded metal while the armature cylinder is ½ inch standard expanded metal. This embodiment is considered "preferred" only in the sense that it produced satisfactory results; other dimensions could produce better results under the circumstances, e.g., differing volumes and characteristics of feedstock.

The following examples are provided to merely illustrate the use of the foregoing preferred device and results obtained thereby. They are not to be construed as limiting the invention.

EXAMPLE I

Whole wheat kernel was tempered to a moisture content of 16.5 percent and flaked using a smooth roller mill. The flaked wheat was prewashed under a brief spray on a screen and then fed into the device of the preferred embodiment at the rate of about 2,000 lbs. per hour while the armature was rotated at 17 RPM. The temperature of the wash water was 70° F., 90° F., or 120° F. Each run took about 7 minutes and is the result of a triple pass through the device. Table I shows the yields of various components obtained from each class of wheat at the specificed wash water temperatures. Starch and bran-germ were separated from the wash water by subsequent procedures outside the scope of this invention.

TABLE I

| Run No. | Class of wheat used for fractionation | Vital Gluten[2] Wash Water Temp. (°F) 70 | 90 | 120 | Prime Starch Wash Water Temp. (°F) 70 | 90 | 120 | Bran-Germ Wash Water Temp. (°F) 70 | 90 | 120 | Process Rating[1] |
|---|---|---|---|---|---|---|---|---|---|---|---|
| 1 | Hard red winter (% protein 11.4) | 9.4 | 10.0 | 9.8 | 61.7 | 60.5 | 62.8 | 18.3 | 18.1 | 17.6 | 1 |
| 2 | Hard red spring (% protein 15.9) | 13.1 | 14.7 | 12.9 | 58.4 | 56.2 | 54.3 | 16.2 | 16.4 | 17.5 | 2 |
| 3 | Soft red winter (% protein 12.9) | 10.4 | 10.7 | 10.4 | 60.7 | 61.1 | 60.8 | 18.5 | 16.2 | 16.5 | 3 |
| 4 | White wheat (% protein 12.5) | 7.9 | 8.8 | 8.7 | 64.1 | 61.4 | 64.2 | 16.4 | 17.1 | 14.6 | 4 |
| 5 | Durum (% protein 15.5) | 12.2 | 12.1 | 10.4 | 57.6 | 60.3 | 47.8 | 17.0 | 13.7 | 13.4 | 5 |

[1]The column titled "Process Rating" is a judgment based on our experience as to the ease by which fractionation can be obtained, with "5" being most difficult. Factors entering this judgment include such things as the stickness of the products, the rate of washing the starch from the gluten, and the ease of washing the bran-germ from the gluten.

[2]The maximum possible recovery of vital gluten is about 95% of the protein in the wheat.

EXAMPLE II

The vital gluten produced in Example I after each successive step in the process was partially dried and then assayed for fiber and protein content.

TABLE II

| Analysis of Vital Gluten | | | |
|---|---|---|---|
| Sample | % Protein | % Fiber | % Residual[3] |
| 1. Product from prewash | 38.9 | 6.9 | 54.2 |
| 2. Product after first pass | 51.5 | 5.8 | 42.7 |
| 3. Product after second pass | 69.1 | 2.5 | 28.4 |

TABLE II-continued

Analysis of Vital Gluten

| Sample | % Protein | % Fiber | % Residual [3] |
|---|---|---|---|
| 4. Product after third pass [4] | 73.4 [2] | 0.9 | 25.7 |

[1] About 90% of this figure is vital gluten; the remainder is present in wheat germ contaminant or soluble proteins.
[2] Includes an insignificant contribution by wheat germ at this point.
[3] Includes starches, pentosans, minerals, about 10% moisture, and other minor components.
[4] Gluten vitality excellent.

EXAMPLE III

Wet vital gluten having the initial moisture content specified in Table II was fed into the device of the preferred embodiment as the armature rotated at 17 RPM. The recirculation and spray systems were superfluous and accordingly were not operated, except to the extent the former system was used to remove expressed water from the tank. Each run took about 7 minutes and is the result of a single pass through the device. The results described in Table II show clearly that uniform dewatering can be achieved.

TABLE III

Dewatering Wet Gluten

| Sample | % starting moisture, by weight | % final moisture, by weight |
|---|---|---|
| 1 | 72.1 | 59.2 |
| 2 | 75.2 | 57.8 |
| 3 | 69.9 | 59.1 |

Having thus described our invention We claim:

1. A device for separating wheat gluten from wheat starch, bran, and germ, said device comprising:
   a. an armature fixed at a angle greater than horizontal, said armature thus having a lower and upper end, including
      i. a cylinder having a smaller diameter at the lower end of said armature and a larger diameter at the upper end of said armature, said cylinder including a plurality of peaked, elbow-shaped ridges on its exterior surface;
      ii. helical flights set in a spiral around and protruding outwardly from said cylinder, said flights having substantially the same diameter throughout the entire length of said cylinder;
   b. means for spraying liquid onto the upper end of said armature;
   c. a stator substantially enveloping the length and circumference of said armature and spaced at a substantially constant distance from said helical flights, said stator being foraminous over a major portion thereof;
   d. tank means for retaining liquid around and within at least a portion of said stator and for collecting liquid introduced by said spraying means, said tank means having a lower and upper end; and
   e. feed means communicating with the interior of said stator at the lower end of both said stator and said armature for introducing a gluten-containing wheat product.

2. The device of claim 1 further comprising a means for rotating said armature.

3. The device of claim 1 further comprising a means for recirculating liquid from the lower end to the upper end of said tank means.

4. The device of claim 3 wherein the means for recirculating comprises a conduit exterior of said tank means which communicates with both the lower end and upper end of said tank means and, interposed between the ends of said conduit, both a means for pumping liquid from the lower end to the upper end of said tank means and a means for drawing-off liquid from said conduit.

5. The device of claim 1 wherein the tank means is round bottomed.

6. The device of claim 1 wherein the tank means has a bottom sloped at substantially the same angle as the armature and stator.

7. The device of claim 1 wherein the feed means is a hopper.

8. The device of claim 1 wherein the feed means is a pump.

9. The device of claim 1 wherein the diameter of the cylinder increases gradually from the lower to upper end of said cylinder.

10. The device of claim 1 wherein the diameter of the cylinder increases incrementally from the lower to upper end of said cylinder.

11. The device of claim 10 wherein the diameter increases in three increments.

12. The device of claim 1 wherein the cylinder is impermeable to liquid.

13. The device of claim 1 wherein the cylinder is constructed of standard expanded metal.

14. The device of claim 1 wherein the helical flights are set in an unbroken spiral from one end of the cylinder to the other.

15. The device of claim 14 wherein the surface of the flights is smooth.

16. The device of claim 1 wherein the stator is constructed entirely of screen wire.

17. The device of claim 16 wherein the screen wire is flat expanded metal.

18. The device of claim 7 wherein the portion of the stator opposite the hopper is a smooth, solid surface.

19. The device of claim 1 wherein the tank means includes a gutter located beneath the portion of the stator and the upper end of the armature which is sprayed by the spraying means.

20. The device for separating wheat gluten from wheat starch, bran, and germ, said device comprising:
   a. an armature fixed at an angle of about 30° greater than horizontal, said armature having a lower and upper end, including
      i. a cylinder having an incrementally increasing diameter from the lower to upper end of the armature, said cylinder being constructed of standard expanded metal, and
      ii. helical flights set in an unbroken spiral around and protruding outwardly from the cylinder, said flights having substantially the same diameter throughout the entire length of said cylinder;

b. means for spraying liquid onto the upper end of the armature;
c. a stator substantially enveloping the length and circumference of the armature and spaced at a constant distance from said helical flights said stator being constructed of screen wire having mesh openings sufficiently large to pass water, bran, and germ but small enough to retain said gluten;
d. cylindrical tank means for retaining liquid around and within at least a portion of said stator and for collecting liquid introduced by said spraying means, said tank means having an upper and lower end;
e. a hopper communicating with the interior of said stator at the lower end of both said stator and said armature for introducing a gluten-containing wheat product; and
f. means for recirculating liquid from the lower to the upper end of said tank means.

21. A device for uniformly dewatering wheat gluten, said device comprising:
a. an armature fixed at an angle greater than horizontal, said armature having a lower and upper end, including
  i. a cylinder having a smaller diameter at the lower end of said armature and a larger diameter at the upper end of said armature, said cylinder including a plurality of peaked elbow-shaped ridges on its exterior surfaces; and
  ii. helical flights set in a spiral around and protruding outwardly from said cylinder, said flights having substantially the same diameter throughout the entire length of said cylinder;
b. a stator substantially enveloping the length and circumference of said armature and spaced at a constant distance from said helical flights, said stator being foraminous over a major portion thereof; and
c. feed means communicating with the interior of said stator at the lower end of both said stator and said armature for introducing wet wheat gluten.

22. The device of claim 21 wherein the armature is impermeable to the passage of liquid into its interior.

* * * * *